3,212,392
CUP HEAD SCREW
Samuel K. Wald, Rockford, Ill., assignor to National Lock Co., Rockford, Ill., a corporation of Delaware
Filed June 22, 1962, Ser. No. 204,404
2 Claims. (Cl. 85—45)

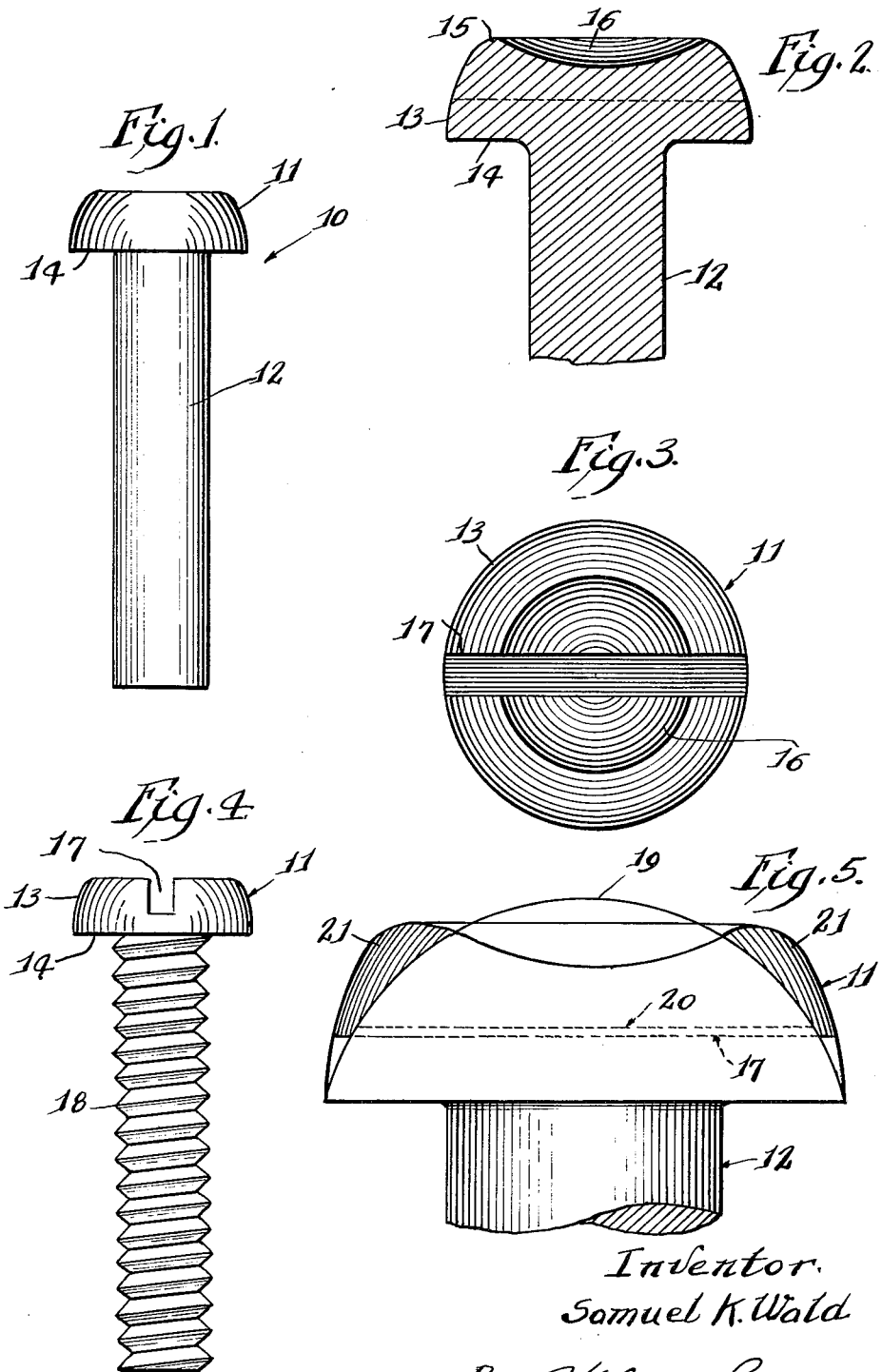

The present invention relates to a novel screw, and more particularly to a novel cup head screw having higher torque and driver characteristics over round head and other conventional types of screws.

Among the objects of the present invention is the provision of a novel cup head screw having a head design and construction requiring no more metal and having superior headability and superior appearance than conventional round head screws.

A further object of the present invention is the provision of a novel cup head screw in which the slotted head is so designed and constructed as to substantially eliminate driver slippage and reduce the breakage of screws under the action of a power-driven screw driver. By disposing the driver grip area away from the axis or center line of the screw, the novel head permits substantially higher torque with less attendant slippage. The latter is accomplished by providing the slotted head with a central depression or concavity and an encompassing elevation or peripheral ridge through which projects the diametrically arranged slot for the reception of the driver bit.

The present invention further comprehends a novel head for a screw of rounded contour in which the peripheral wall projecting from the flat base or lower face of the head is inclined and rounded upwardly and inwardly to form an annular ridge or convex portion encompassing a centrally arranged, relatively shallow concavity, and a diametrically disposed open-ended and relatively deep slot projecting across and through the concavity, peripheral ridge and encompassing convex portion, such arrangement providing a novel driver grip area affording higher torque and less possibility of driver slippage, and especially those in which the tip may be worn.

The present invention further comprehends the provision of a screw in which the novel head is so formed as to provide a finish free from cracks and voids, and such head being capable of use with any type of screw including machine, wood, sheet metal as well as special and finishing screws.

Further objects are to provide a construction of maximum simplicity, efficiency, economy, attractiveness and ease of manufacture, and such further objects, advantages and capabilities as will later more fully appear and are inherently possessed thereby.

In the drawing:

FIGURE 1 is a front elevational view of a cold formed blank having a cupped head prior to slotting and threading.

FIG. 2 is an enlarged fragmentary vertical cross sectional view of the cupped head and a portion of the shank of FIG. 1.

FIG. 3 is an enlarged plan or elevational view of the slotted cupped head of the screw.

FIG. 4 is a front elevational view of the formed slotted and threaded cup head screw.

FIG. 5 is a diagrammatic or illustrative view in which the novel cup head of the illustrated screw is superimposed on the head of a comparable size conventional round head screw to compare their effective driving areas.

Referring more particularly to the drawing wherein is shown an illustrative embodiment of the present invention, FIG. 1 discloses a cold formed blank 10 having a cupped head 11 and a depending shank 12 prior to threading. The cupped head 11 as more clearly shown in FIG. 2, has a generally rounded surface 13 extending upward from a flat base or shoulder 14. The surface 13 gradually tapers upwardly and inwardly to a rounded or convex annular peripheral ridge 15 defining the outer edge of the cupped portion or relatively shallow concavity 16. As shown in FIG. 2, the rounded contour of the ridge 15 merges smoothly into the rounded surface of the encompassed centrally arranged concavity 16.

As clearly shown in FIGS. 2 and 5, the annular ridge 15 is spaced outwardly approximately three-fourths of the distance from the axis of the shank 12 to the external surface of the head 11, and the diameter of the concavity 16 is approximately three-fourths the diameter of the head with the radius of curvature of this concavity substantially greater than the radius of curvature of the external surface of the head.

As seen in FIGS. 3 and 4, a diametrically disposed or transversely extending open-ended slot 17 is formed or machined in the cupped head 11 and passes through the longitudinal axis of the screw and through the periphery of the head as shown in FIG. 4. This slot 17 has parallel side walls and a flat bottom generally perpendicular to the axis of the screw and to the side walls of the slot has a depth greater than that of the dished area or concavity 16 and is adapted to receive the substantially conforming end of a driver for turning the screw. As seen in FIG. 4, the shank 12 is then formed with threads 18. Although the illustrative embodiment shows a machine screw, it is believed obvious that various other types of screws may be provided with the novel cupped head shown.

Referring to FIG. 5 which illustrates the driving areas of the cupped head 11 of the screw of the present invention as compared with that of the head 19 of a conventional and similar size round head screw having a transverse slot 20, the shaded areas at 21 disclose the improvement in the driving area of the novel cup head screw over that of the round head screw. From this illustration, one can observe the shift of the driving area away from the axis or center line of the screw (illustrated by the round head screw) towards the periphery of the head (illustrated by the screw of the present invention). The location of and the resulting increase in effective driving area permits substantially higher torque with less attendant slippage of the driver; which slippage results in breakage or deformation in the conectional screw heads and possible damage to the driving member.

Tests were conducted comparing with the cup head screws of the type disclosed, round head and truss head machine screws of similar size and intended for similar uses. The test was to determine the torque at which a screw driver bit slipped in the slot of the screw; the results of this test being shown in the following table:

Table

| Screw: | Torque, inch pounds |
|---|---|
| Round head | 24 |
| Truss head | 28 |
| Cup head | 31 | but at this average torque the driver did not slip but rather the cup head screws broke at the 31 inch pounds average torque. Thus, utilizing proper drivers, the problem of driver slippage may be eliminated by the use of the novel construction of cup head screws. It should be noted that the greater driving surface for a screw driver or other implement is away from the axis of the screw at the ridge 15 where the edges of the driver will abut and exert the larger proportion of the driving force.

Having thus described the invention, I claim:

1. A screw comprising a shank and an enlarged cup head having a base extending normal to the axis of the screw and a continuously curved upper surface including a central concavity merging into an encompassing annular ridge defining the uppermost part of the head and spaced outwardly approximately three-fourths of the distance from the axis of the shank to the external surface of the head, and a diametrically arranged and relatively deep open-ended slot extending completely across the head and through the ridge and of a depth greater than the depth of the concavity with maximum depth in the slot extending through the spaced slotted portions of the annular ridge to provide a grip area for the blade of a screwdriver in each of said spaced slotted portions of the ridge, said grip areas being widely spaced apart outwardly from the axis of the screw for high torque and minimum slippage of the driver when applied to the screw, said slot having parallel side walls and a flat bottom generally perpendicular to the screw axis and the side walls, and said central concavity having a diameter approximately three-fourths of the diameter of the head and having a radius of curvature substantially greater than the radius of curvature of the external surface of the head.

2. A cup head screw comprising a threaded shank and an enlarged head having a flat base extending normal to the axis of the shank and a rounded external surface extending upwardly and curving inwardly from said base and at its upper circumference providing a circumferential rounded ridge and a central concavity encompassed by said ridge with the ridge defining the uppermost part of said head and spaced outwardly approximately three-fourths of the distance from the axis of the shank to the external surface of the head, and a relatively deep diametrically disposed and open-ended slot for receiving the flat blade of a screwdriver, said slot having parallel side walls and a flat bottom generally perpendicular to the screw axis and the side walls and extending through and completely across said concavity and its encompassing ridge with the maximum depth of the slot for maximum torque being in the widely spaced slotted portions of the rounded ridge whereby the driver grip area of said head for maximum torque is spaced outwardly from the axis of the screw, said concavity having a diameter approximately three-fourths of the diameter of the head and having a radius of curvature substantially greater than the radius of the external surface of the head.

References Cited by the Examiner
UNITED STATES PATENTS

| | | | |
|---|---|---|---|
| 391,097 | 10/88 | Thayer | 85—45 |
| 2,322,509 | 6/43 | DeVellier | 85—45 |
| 2,556,155 | 6/51 | Stellin | 85—45 |

EDWARD C. ALLEN, *Primary Examiner.*